(12) United States Patent
McCall et al.

(10) Patent No.: US 7,502,846 B2
(45) Date of Patent: Mar. 10, 2009

(54) MONITORING SERVICE WITH INTER-ENTERPRISE CONTEXTUAL ANALYSIS

(75) Inventors: Keith A. McCall, Sammamish, WA (US); Ronald S. Woan, Redmond, WA (US)

(73) Assignee: Azaleos Corporation, Redmond, WA (US)

( * ) Notice: Subject to any disclaimer, the term of this patent is extended or adjusted under 35 U.S.C. 154(b) by 0 days.

(21) Appl. No.: 12/144,892

(22) Filed: Jun. 24, 2008

(65) Prior Publication Data

US 2008/0250141 A1    Oct. 9, 2008

Related U.S. Application Data

(63) Continuation-in-part of application No. 11/965,443, filed on Dec. 27, 2007, which is a continuation-in-part of application No. 11/322,758, filed on Dec. 30, 2005, now abandoned, application No. 12/144,892, which is a continuation-in-part of application No. 11/282,169, filed on Nov. 17, 2005.

(60) Provisional application No. 60/688,426, filed on Jun. 8, 2005, provisional application No. 60/688,507, filed on Jun. 7, 2005.

(51) Int. Cl.
| | |
|---|---|
| *G01D 1/00* | (2006.01) |
| *G06F 15/00* | (2006.01) |
| *G06F 9/44* | (2006.01) |
| *G06F 15/177* | (2006.01) |
| *G06F 15/173* | (2006.01) |
| *G06F 9/445* | (2006.01) |
| *G06F 11/30* | (2006.01) |
| *G06M 11/04* | (2006.01) |

(52) U.S. Cl. .............. 709/223; 702/127; 702/182; 709/203; 709/220; 709/221; 709/222; 709/224; 717/173; 717/178

(58) Field of Classification Search ................. 709/223
See application file for complete search history.

(56) References Cited

U.S. PATENT DOCUMENTS

| | | | | |
|---|---|---|---|---|
| 6,327,677 | B1 * | 12/2001 | Garg et al. ................. | 714/37 |
| 6,675,128 | B1 * | 1/2004 | Hellerstein ................. | 702/182 |
| 6,708,137 | B2 * | 3/2004 | Carley ........................ | 702/179 |
| 7,031,263 | B1 * | 4/2006 | Sun et al. ................... | 370/252 |
| 7,120,684 | B2 * | 10/2006 | Lawing et al. ............. | 709/223 |
| 7,290,258 | B2 * | 10/2007 | Steeb et al. ................ | 717/178 |
| 7,346,672 | B2 * | 3/2008 | Harvey, IV ................ | 709/221 |
| 7,350,201 | B2 * | 3/2008 | Ferri et al. ................. | 717/168 |
| 7,379,982 | B2 * | 5/2008 | Tabbara ...................... | 709/220 |
| 2003/0140137 | A1 * | 7/2003 | Joiner et al. ............... | 709/224 |
| 2003/0212716 | A1 * | 11/2003 | Steele et al. ............... | 707/203 |

\* cited by examiner

*Primary Examiner*—Jeffrey Pwu
*Assistant Examiner*—Willow Noonan
(74) *Attorney, Agent, or Firm*—Schwabe, Williamson & Wyatt, P.C.

(57) ABSTRACT

Methods and apparatuses for receiving data associated with one or more system metrics, contextually analyzing that data in view of prior received data of other computer systems of different subscriber enterprises, determining, based at least in part on the results of the contextual analysis, if an alert needs to be sent, and sending or causing to be sent an alert, are described herein. In various embodiments, the methods and apparatuses are further for managing computer systems of subscriber enterprises, including providing updated operating images. Other embodiments may also be disclosed.

16 Claims, 6 Drawing Sheets

System Metric Summary

| Enterprise | Computer System | | |
|---|---|---|---|
| Enterprise A <at risk> :-\| 302 | Computer System 1 <healthy> :-) 304 | Computer System 2 <at risk> :-\| 306 | Computer System 3 <healthy> :-) 308 |
| Enterprise B <critical> :-( 310 | Computer System 1 <healthy> :-) 312 | Computer System 2 <healthy> :-) 314 | Computer System 3 <critical> :-( 316 |
| Enterprise C <healthy> :-) 318 | Computer System 1 <healthy> :-) 320 | Computer System 2 <healthy> :-) 322 | Computer System 3 <healthy> :-) 324 |

MONITORING SERVICE WITH INTER-ENTERPRISE CONTEXTUAL ANALYSIS

CROSS-REFERENCES TO RELATED APPLICATIONS

This application is a Continuation in Part of U.S. application Ser. No. 11/965,443, filed on Dec. 27, 2007, entitled MONITORING SERVICE WITH INTER-ENTERPRISE CONTEXTUAL ANALYSIS, the specification and drawings of which are incorporated herein in full by reference. Application No. '443 is itself a Continuation in Part of and claims priority to U.S. application Ser. No. 11/322,758, filed on Dec. 30, 2005, entitled SUBSCRIBER BASED MONITORING SERVICE WITH CONTEXTUAL ANALYSIS, the specification and drawings of which are incorporated herein in full by reference. Application No. '758 claims priority to U.S. Provisional Application No. 60/688,426, filed on Jun. 8, 2005, entitled ACTIVE STATISTICAL RULES-BASED MONITORING, the specification and drawings of which are incorporated herein in full by reference. This application is further a Continuation in Part of U.S. application Ser. No. 11/282,169, filed on Nov. 17, 2005, entitled IMAGE-BASED SYSTEM MAINTENANCE, the specification and drawings of which are incorporated herein in full by reference. Application '169 claims priority to U.S. Provisional Application No. 60/688,507, filed on Jun. 7, 2005, entitled IMAGE BASED SYSTEM PATCH MANAGEMENT FOR HIGHLY AVAILABLE SYSTEMS, the specification and drawings of which are incorporated herein in full by reference.

TECHNICAL FIELD

Embodiments of the present invention relate to the field of data processing, in particular, to contextually analyzing received data of a subscriber enterprise in view of prior received data of one or more different subscriber enterprises.

BACKGROUND

Continuous advancements in the speed of processors, system memory, and storage have allowed software developers to create programs of increasing complexity and usefulness. Concomitant with these advancements, problems have arisen with both the execution of the programs and with the interaction of the programs with each other and with the systems on which they execute. In response, software developers have created useful monitoring software and systems which alert program and system users to problems with the execution of the program or with its interaction with the system on which it executes. By alerting users to the problems and their nature, fixes may be arrived at more readily and with less inconvenience and down-time to users. Also, advancements in networking and client-server technologies have greatly improved monitoring programs and systems by allowing a computer system or environment other than the system with the problem to monitor and alert the system remotely.

Today, monitoring software and systems typically rely on the comparison of stored system and process metric data to pre-set "normal" performance values. Such pre-set values usually reflect an entity/enterprise's individual determination of what "normal" performance would be for the particular system or process metric. Except for information exchanged in conferences or via publication, there is little or virtually no real-time sharing or cooperation across entities/enterprises on the subject of information technology infrastructure management.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments of the present invention include but are not limited to methods and apparatuses for receiving data associated with one or more system metrics from computer systems of a number of subscriber enterprises of monitoring services, contextually analyzing that data in view of prior received data of one or more other computer systems of the same or different subscriber enterprises, determining, based at least in part on the results of the contextual analysis, whether an alert needs to be sent, and sending or causing to be sent an alert, are described herein.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The term "enterprise" as used herein, in the specification and the claims, refers to a commercial or non-commercial entity, such as a multinational enterprise like IBM, a state or municipal government, or a charity organization like the American Red Cross, or a conglomerate of these entities, such as the Internal Revenue Service and the State Department of the Federal Government, the separately operated military and the commercial aircraft divisions of an airplane manufacturer, the separately operated aircraft engine and nuclear reactor divisions of a large multi-national, and so forth.

The term "subscriber" as used herein, in the specification and the claims, refers to an enterprise that enters into a subscription agreement with a different enterprise that provides monitoring services (hereinafter "monitoring service provider") to the particular as well as other subscribing enterprises.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
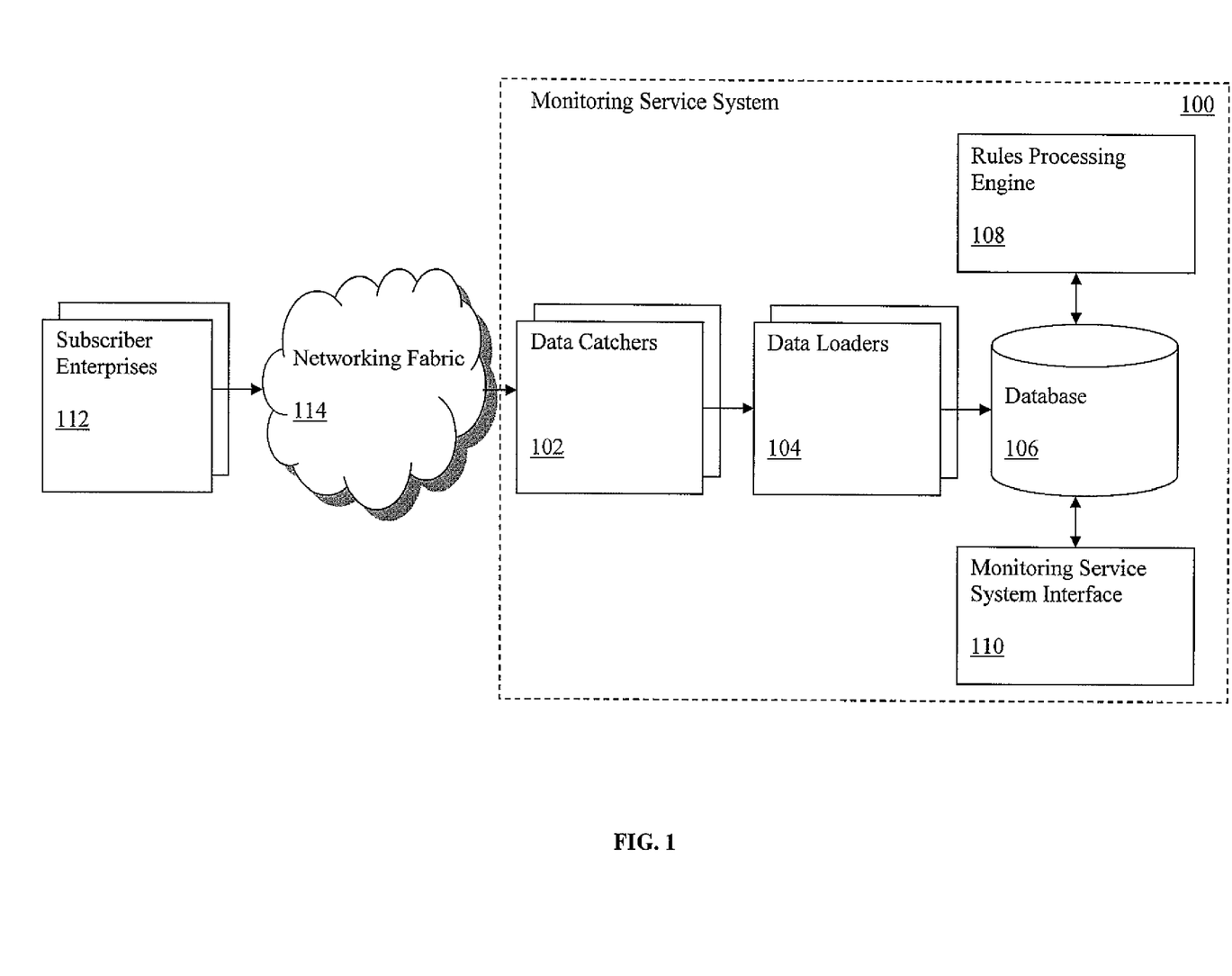
FIG. 1 illustrates an overview of the monitoring service system aspect of the present invention, in accordance with various embodiments.

FIG. 1 illustrates an overview of the monitoring service system aspect of the present invention, in accordance with various embodiments. The term "monitoring service system" as used herein refers to a system of one or more computing devices operated by a third party enterprise ("monitoring service provider") to service one or more subscriber enterprises that are different to and external from the monitoring service provider, more specifically, monitoring one or more service metrics of computer systems of the subscriber enterprises. Typically, though not necessarily, subscriber enterprises compensate the monitoring service provider of a monitoring service system.

For the illustrated embodiments, monitoring service system 100 may include one or more data catcher modules 102, one or more data loader modules 104, database(s) 106, rule processing engine(s) 108, and monitoring service system interface 110, coupled to each other as shown. The term "module" as used herein refers an organization unit of logic, which may be at different levels for different implementations. A module may also be referred to as a routine, a task, and so forth, unless the context requires otherwise.

As illustrated, monitoring service system 100 receives data associated with one or more system metrics from computer systems of subscriber enterprises 112 subscribing for monitoring services from monitoring service system 100. In some embodiments, the data may be received by one or more data catcher modules 102 of monitoring service system 100. The data catcher module 102, upon receiving the received data, may place the received data in a receive directory of the monitoring service system 100. One or more data loader modules 104 of monitoring service system 100 may watch the receive directory, and upon noting new, complete packets of received data stored in the receive directory, may validate the received data and load the received data into a database 106 of the monitoring service system 100. In various embodiments, the data catcher module 102 and data loader module 104 may be implemented on the same computer systems or on different computer systems. In fact, each of data catcher module 102 and data loader module 104 may be implemented on multiple computer systems to facilitate receipt of data from a greater number of subscriber enterprises 112.

Continuing to refer to FIG. 1, as illustrated, for the embodiments, database 106 of the monitoring service system 100 may store the received data of the one or more subscriber enterprises 112 and may further store prior received data of the same one or more subscriber enterprises 112 or of other subscriber enterprises. Also, database 106 may, in some embodiments, also store summarization data values, generated baseline metrics, statistical summaries, and other data generated by monitoring service system 100, described in further detail below.

In various embodiments, the rules processing engine 108 of the monitoring service system 100 may perform a number of monitoring and data management functions. First, upon either a pre-determined time basis or in real time, as the received data is stored in the database 106, rules processing engine 108 may contextually analyze the received data. The term "contextual analysis" and it variants as used herein refer to analysis performed with a context, such as in view of prior received data of the one or more system metrics of the one or more computer systems of the one or more subscriber enterprises 112 and/or of one or more other computer systems of other subscriber enterprises. Based at least in part on the results of the contextual analysis, monitoring service system 100 may determine if an alert is needed, and if an alert is needed, may send the alert or cause the alert to be sent.

In contextually analyzing the received data, rules processing engine 108 may, in some embodiments, either retrieve or generate statistical/summarization data capable of serving as one or more baseline metrics. In generating such a baseline metric, rules processing engine 108 may perform one or more statistical operations, such as calculating a mean and/or median, a variance or standard deviation, a third or higher moment, and so forth, upon prior received data of the one or more system metrics of the one or more computer systems of the one or more subscriber enterprises 112 and/or of one or more other computer systems of other subscriber enterprises. Upon generating or retrieving the baseline metric, rule processing engine 108 may compare the received data of a subscriber enterprise to the baseline metric derived from the received data of the plurality or a subset of the plurality of subscriber enterprise. In other words, the received data of a subscriber enterprise 112 may be compared against the baseline metrics of all subscriber enterprises 112, or a subset of other subscriber enterprises 112 of e.g. the same industry, the same geography, the same size, or other same "attributes". In various embodiments, this comparison operation of the contextual analysis is facilitated by a configurable ruleset of the rules processing engine 108. The configurable ruleset may be comprised of one or more rules capable of facilitating Boolean evaluation. For example, the ruleset may compare the received data to the baseline metric and, if the received data is greater than the baseline metric, may return a value such as "true" or "false."

As used herein, the "contextual analysis" of rules processing engine 108 may further comprise both automated and manual processes and procedures. In some embodiments, the automated processes and procedures may involve advanced rules processing engine 108 modules (not shown) for intelligent and threshold-based analysis, including but not limited to functions that leverage probability theory in predicting monitoring trends including, in various embodiments, Bayesian statistical analysis.

Further, in various embodiments, monitoring service system 100 may make use of the results of contextual analysis in determining whether or not to send an alert to one or more subscriber enterprises 112. In other words, the alert may be sent to the subscriber enterprise 112 being analyzed. However, if a sufficient number of subscriber enterprises are being alerted, other subscriber enterprises 112 of like type or similarly situated may also be alerted. What constitutes like type or similarly situated may be implementation dependent. For example, if the configurable ruleset facilitated comparison returns a value of "true," monitoring service system 100 may generate an alert for the subscriber enterprise 112 being analyzed (and optionally, other "similarly situated" subscriber enterprises 112). Conversely, if the configurable ruleset facilitated comparison returns a value of "false," monitoring service system 100 may not generate an alert. Further, in some embodiments, results of the contextual analysis may even be used to categorize the alert into a level. Levels that may be used in some embodiments include informational, warning, and/or critical. The alert to be sent may be categorized as any of the above or may be categorized as some other level.

If it is determined by monitoring service system 100 that an alert should be sent, monitoring service system 100 will send the alert or cause the alert to be sent. In some embodiments, as alluded to earlier, monitoring service system 100 sends the alert to the one or more computer systems of the one or more subscriber enterprises 112 which had sent the received data, and optionally, to other "similarly situated" or all other subscriber enterprises 112.

Also, in various embodiments, rules processing engine 108 provides ongoing maintenance of the database 106 of monitoring service system 100. Rules processing engine 108 may accomplish this task by generating and maintaining a set of data retention standards for data stored in database 106. These standards may be applied to the data of database 106 on a predetermined time basis, or in real time as received data is stored by data loader 104 in database 106. The standards may determine different types of treatment for different types of data. For example, raw processor data may be kept for a month, while process/service data may be kept only for a day. The data retention standards may also determine what monitoring service system 100 will do with the data pruned by rules processing engine 108. In some embodiments, the pruned data may be archived.

Further, in some embodiments, rules processing engine 108 may generate and maintain summarization data values in database 106. Data values may include such metrics as mean, median, variance, standard deviation or higher moment values for a specific set of data (e.g., for a specific enterprises 112 or for a specific industry group) over a period of time such as hourly, daily, weekly, or monthly. These metric types and time periods are by no means exhaustive, however. Additionally, maintained data values may be used to facilitate generation of the baseline metric used in the above described contextual analysis or may serve as the baseline metric. Further, the summarization data values generated and maintained by rules processing engine 108 may be used for historical trend analysis and in the maintaining of a summary of system metrics, this summary in some embodiments referred to as a "scoreboard."

Figure 3:
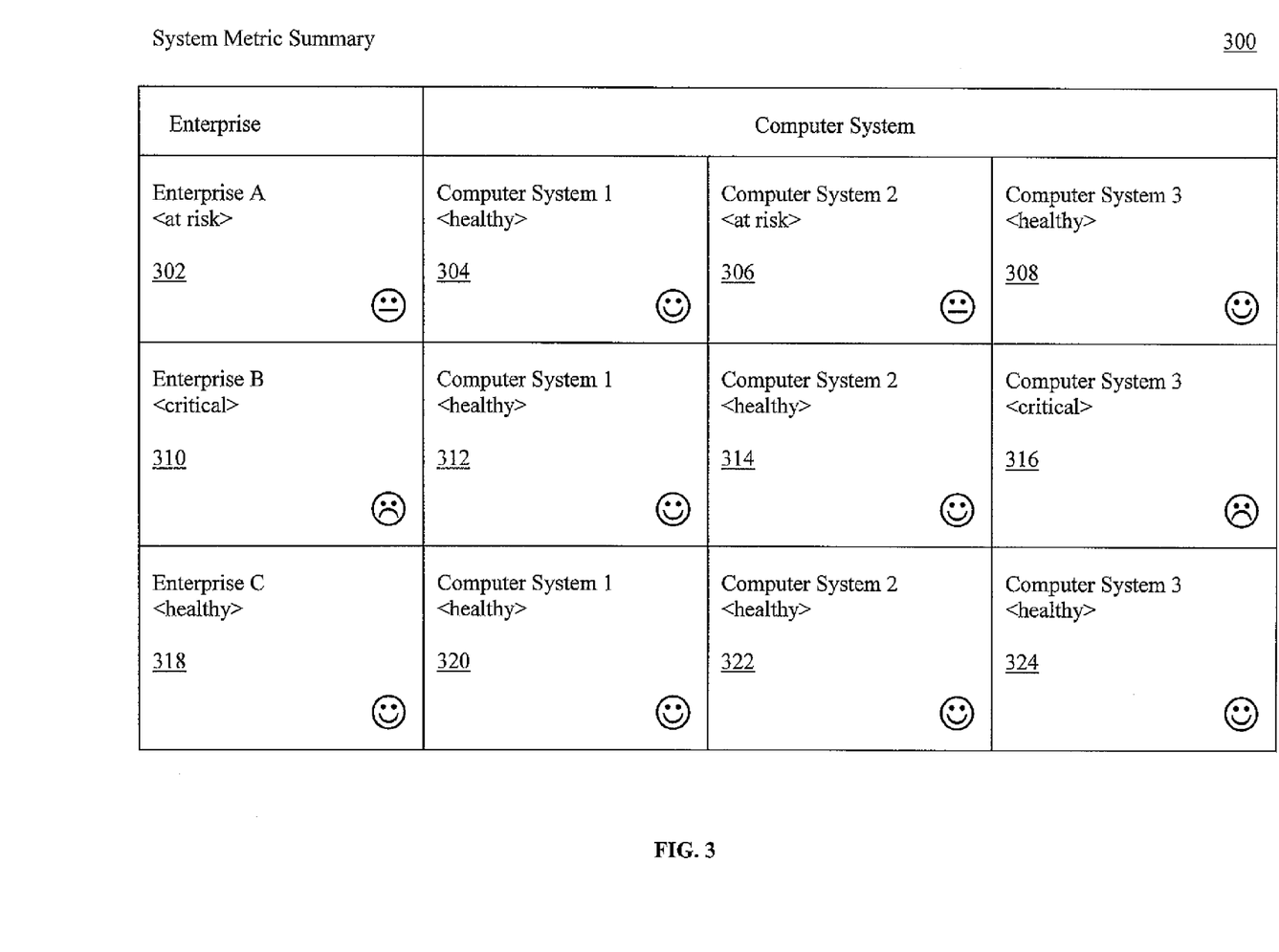
FIG. 3 illustrates an exemplary system metric summary view, capable of display in the monitoring service system interface aspect of the present invention, in accordance with various embodiments of the invention.

Additionally, in various embodiments, rules processing engine 108 may generate and maintain the above mentioned summary of system metrics ("scoreboard"). The system metric summary may summarize the "health" of one or more subscriber enterprises in a single place, in some embodiments viewable as a graphic user interface. "Health" is contextually defined as a result of the above described analysis and may be classified as any one of a number of levels, including "healthy," "at risk," and "intervention required/critical." In some embodiments, these levels may correspond to the above described alert levels, with a "critical" alert corresponding to a "intervention required/critical" health status and with a "warning" alert level corresponding to an "at risk" health status. The graphical aspect of this system metric summary of rules processing engine 108 is illustrated in FIG. 3 and described in greater detail below.

Also, as illustrated, monitoring service system 100 provides a monitoring service system interface 110 to facilitate a user of monitoring service system 100 in monitoring the one or more computer systems of the one or more subscriber enterprises 112. In various embodiments, monitoring service system interface 110 may facilitate monitoring service system 100 users in viewing the system metric summary, discussed above and below and depicted in FIG. 3. Monitoring service system interface 110 may also provide a view into database 106, allowing users to review summarization data values, baseline metrics, and raw received data. Additionally, monitoring interface 110 may, in some embodiments, be implemented as a graphical user interface, although it need not be.

Figure 4:
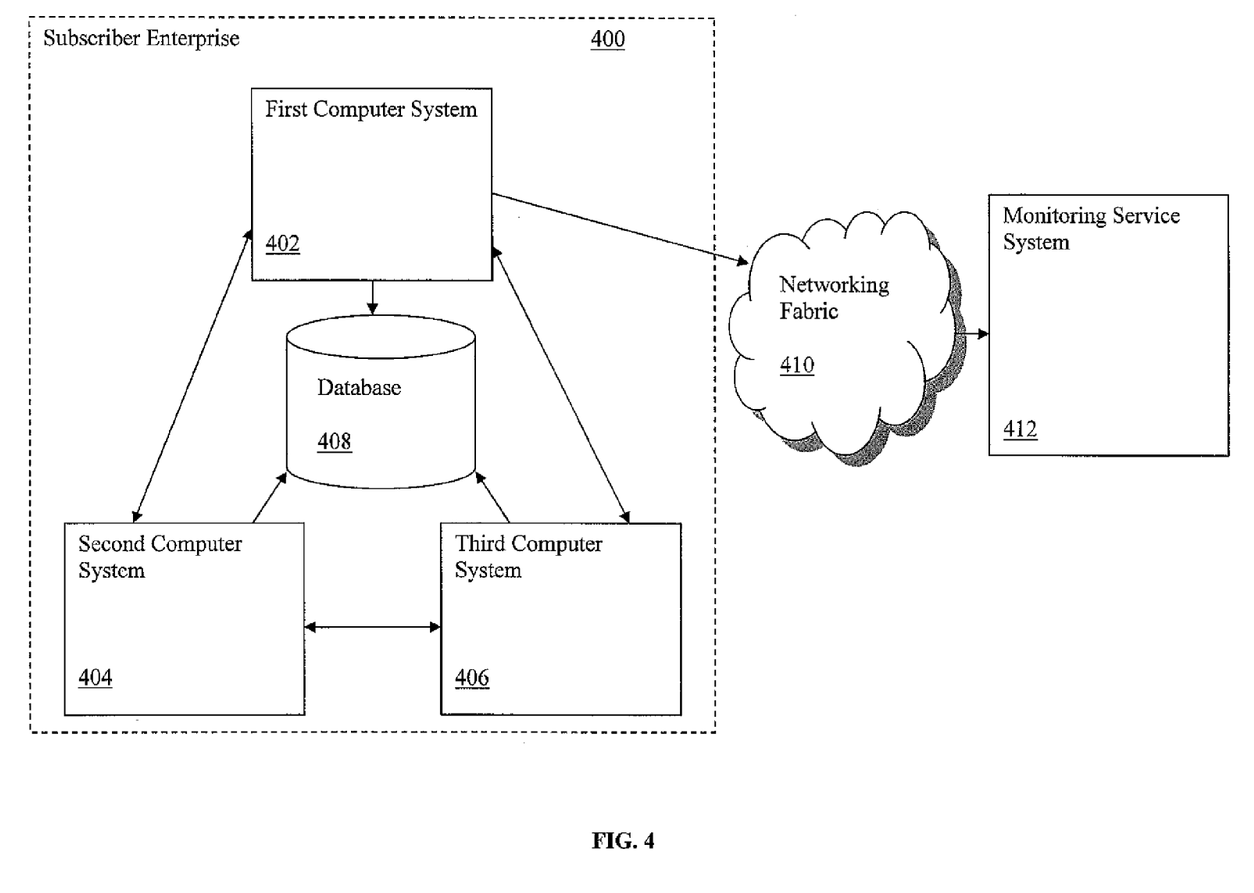
FIG. 4 illustrates an overview of the subscriber enterprise aspect of the present invention, in accordance with various embodiments of the invention.
Figure 5:
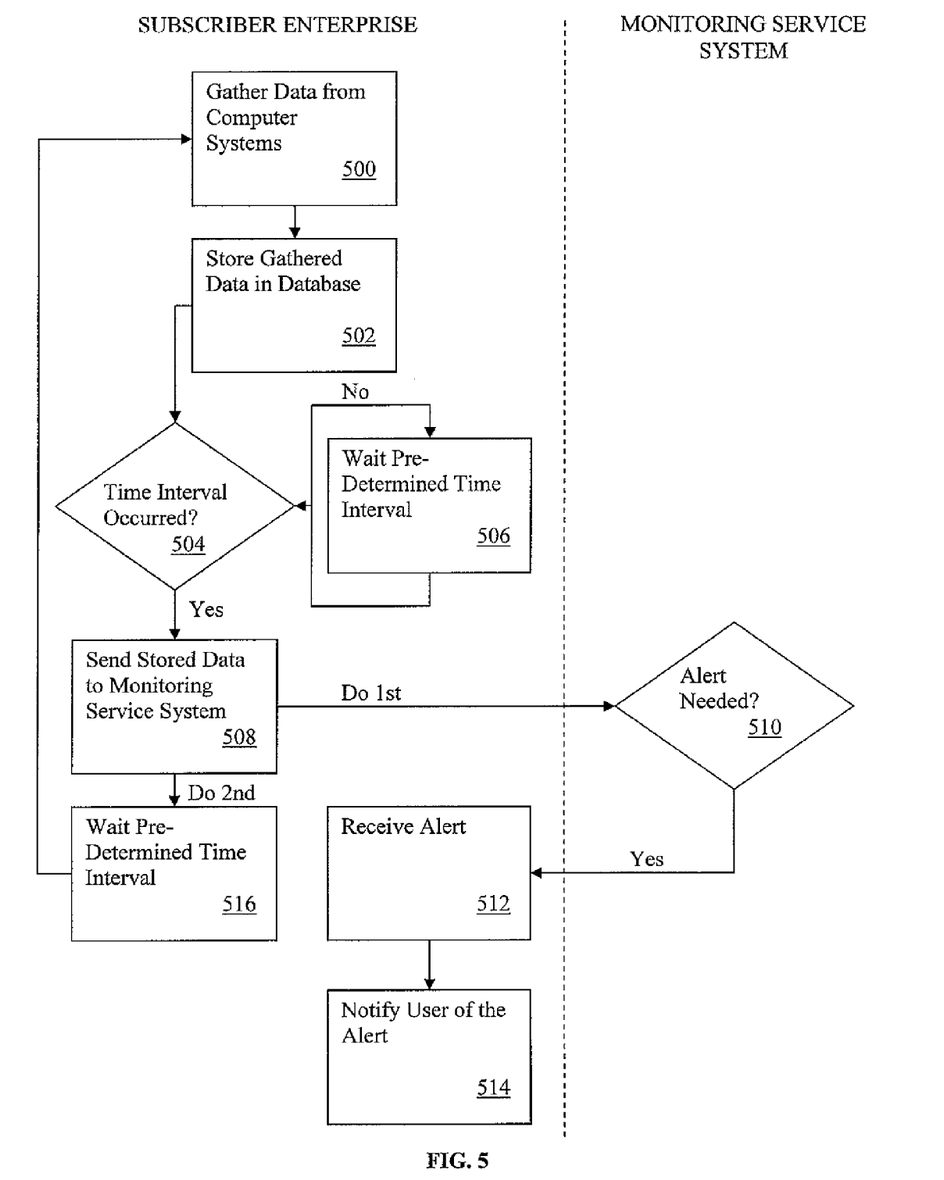
FIG. 5 illustrates a flow chart view of selected operations of the methods of the subscriber enterprise aspect of the present invention, in accordance with various embodiments of the invention.

Further, as illustrated, monitoring service system 100 receives the received data from one or more subscriber enterprises 112. An exemplary subscriber enterprise and its operation are depicted in FIGS. 4 and 5 and described in greater detail below. Subscriber enterprises 112 may, in some embodiments, both send data associated with one or more system metrics and receive alerts which may be related to the sent data. Further, subscriber enterprises 112 may include one or more computer systems, each having one or more partitions related to each other in one or more dimensions of relational axes, the one or more computer systems in some embodiments operating as a collaborative unit or cluster. The data sent may be associated with system metrics of any one or more of the computer systems of a subscriber enterprise 112, such as storage consumption. Also, a subscriber enterprise 112 may send data, in various embodiments, in either real time or at pre-determined time intervals. And additionally, in some embodiments, at least some of the computer systems of a subscriber enterprise 112 may be maintained through image-based maintenance, which is the subject of co-pending patent application Ser. No. 11/282,169, entitled "IMAGE-BASED SYSTEM MAINTENANCE", filed on Nov. 17, 2005. Patent application Ser. No. 11/282,169 is hereby fully incorporated herein by this reference.

Patent application Ser. No. 11/282,169 describes in detail methods and apparatuses for a service to provide external computer systems with a replacement operating image, while the computer systems continue operating with a current operating image at the time of receiving the replacement operating image. In one embodiment, the replacement operating image is a generic image that must be customized with configuration data to localize it to a computer system. The computer systems may then switch the operating images, making the received replacement operating image the new current operating image, retiring or off-lining the previous current operating image. In some embodiments, a image-based managed computing system may comprise a number of partitions or virtual machines, such as three partitions or virtual machines. In such a computer system, each partition or virtual machine may have a different role. For example, a first (primary) partition or virtual machine may initially be the operating partition or virtual machine of the computer system operating with the current operating image. Concurrently, a second (auxiliary, secondary or stand-by) partition or virtual machine may be employed to receive the replacement operating image, while the computer system is operating with the current operating image using the first partition or virtual machine, and a third (management) partition or virtual machine may be employed to host a control process to apply the configuration data to the generic, replacement operating image received in the second partition or virtual machine, and after localization, at the instructed time, to reboot the computer system to switch to operate with the partition or virtual machine having the localized replacement operating image as the current operating image (switching the roles of the partitions or virtual machines). In alternate embodiment, rather than the above example of three or more partitions or virtual machines, a subscriber enterprise may have computer systems grouped into clusters of three or more computers, such that each of three or more computer systems perform the above described roles of the three or more partitions or virtual machines. In this manner, the service may periodically transmit replacement operating images with maintenance fixes and/or enhancements, and include instructions with the transmissions instructing the computer systems to switch to the replacement operating image, with minimal interruptions to operations of the monitored computer systems, further enhancing the efficiency and effectiveness of the monitored computer systems.

In various embodiments, monitoring service system 100 may be a service capable of periodically transmitting the replacement operating images and the monitored computer systems of subscriber enterprise 112 may be configured to operate with current operating images, and yet be able to receive replacement operating images while operating with current operating images, and subsequently switch to operate with the received replacement operating images, as provided and instructed by monitoring system service 100. In various embodiments, monitoring system service 100 may transmit replacement operating images to the monitored computer systems based on the results of the contextual analysis of data received from the monitored computer systems, or in combination with the data received from other monitored computer systems. For further details of image based maintenance, refer to patent application Ser. No. 11/282,169.

As is further illustrated, subscriber enterprises 112 may, in various embodiments, send the data associated with one or more system metrics to the monitoring service system 100, through a networking fabric 114. Networking fabric 114, may be a LAN, a WAN, the Internet, or any other sort of networking fabric known in the art.

Figure 2:
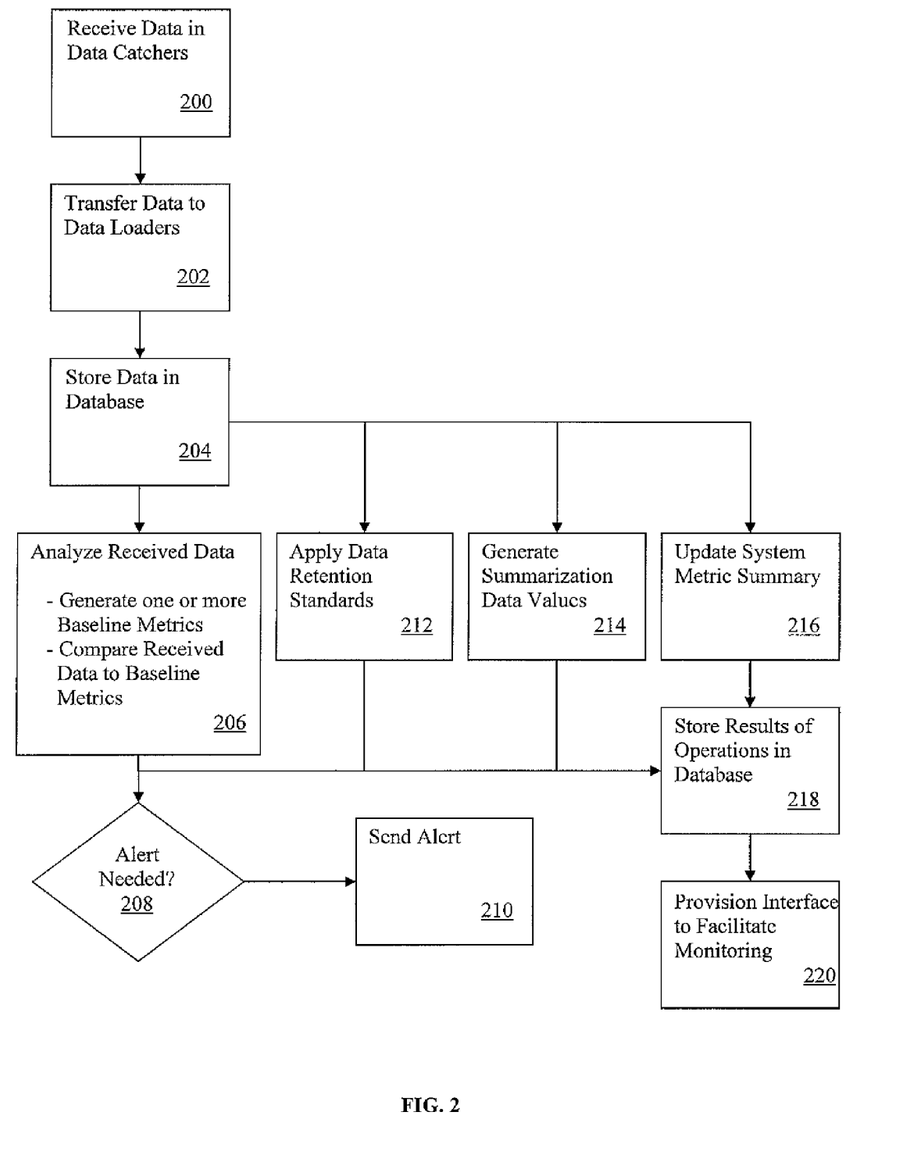
FIG. 2 illustrates a flow chart view of selected operations of the methods of the monitoring service system aspect of the present invention, in accordance with various embodiments of the invention.

FIG. 2 illustrates a flow chart view of selected operations of the methods of the monitoring service system aspect of the present invention, in accordance with various embodiments of the invention. As illustrated, monitoring service system 100 may, in some embodiments, receive data associated with one or more system metrics, from computer systems of various subscriber enterprises, through one or more data catcher modules 102, block 200. Data catcher modules 102 may then transfer the received data to one or more data loader modules 104, block 202. In some embodiments, this transfer is facilitated by placing the received data into a receive directory of monitoring service system 100. Data loader modules 104 watch the receive directory, and upon the complete receipt of a new packet of received data, data loader modules 104 upload the received data through a file system transfer. Also, not illustrated, data loader modules 104 may, in some embodiments, validate the received data in the receive directory before uploading it. Further, the data catcher modules 102 and data loader modules 104 may be implemented on the same computer system or on different computer systems. In fact, each of data catcher modules 102 and data loader modules 104 may be implemented on multiple computer systems to facilitate receipt of data from a greater number of subscriber enterprises 112.

As illustrated, monitoring service system 100 then has the one or more data loader modules 104 store the received data in a database 106 of the monitoring service system 100, block 204. Database 106 may store the received data of the one or more subscriber enterprises 112 and may further store prior received data of the same one or more subscriber enterprises 112 or of other subscriber enterprises. Also, database 106, may, in some embodiments, also store summarization data values, generated baseline metrics, statistical summaries, and other data generated by monitoring service system 100, described further above and below.

Following the storage of the received data in database 106, the monitoring service system 100, in various embodiments, proceeds to contextually analyze the received data of each subscriber enterprise against received data of all or an applicable subset of other subscriber enterprises, block 206, upon either a real time basis, as the data is received, or at predetermined times. In contextually analyzing the received data, rules processing engine 108 may, in some embodiments either retrieve or generate statistical/summarization data capable of serving as one or more baseline metrics for all or groups of subscriber enterprises. In generating such a baseline metric, rules processing engine 108 may perform one or more statistical operations, such as calculating a mean and/or median, and so forth, upon prior received data of the one or more system metrics of the one or more computer systems of the one or more subscriber enterprises 112 and/or of one or more other computer systems of other subscriber enterprises. Upon generating or retrieving the baseline metric, rule processing engine 108 may compare the received data of computer systems of each subscriber enterprise being analyzed to the baseline metrics of all or selected subset(s) of subscriber enterprises. In various embodiments, this comparison operation of the contextual analysis is facilitated by a configurable ruleset of the rules processing engine 108. The configurable ruleset may be comprised of one or more rules capable of facilitating Boolean evaluation. For example, the ruleset may compare the received data to the baseline metric and, if the received data is greater than the baseline metric, may return a value such as "true" or "false."

As used herein, the "contextual analysis" of rules processing engine 108 may further comprise both automated and manual processes and procedures. In some embodiments, the automated processes and procedures may involve advanced rules processing engine 108 modules (not shown) for intelligent and threshold-based analysis, including but not limited to functions that leverage probability theory in predicting monitoring trends, including, in various embodiments, Bayesian statistical analysis.

As illustrated, after contextually analyzing the received data, the monitoring service system 100 may determine if an alert is needed, block 208. In determining if an alert is needed, monitoring service system 100 may make use of the results of the contextual analysis in determining whether or not to send an alert to the subscriber enterprise being analyzed and optionally, other subscriber enterprises. For example, if the configurable ruleset facilitated comparison returns a value of "true," monitoring service system 100 may generate an alert for the subscriber enterprise being analyzed and/or other subscriber enterprises. Conversely, if the configurable ruleset facilitated comparison returns a value of "false," monitoring service system 100 may not generate an alert. Further, in some embodiments, results of the contextual analysis may even be used to categorize the alert into a level. Levels that may be used in some embodiments include informational, warning, and/or critical. The alert to be sent may be categorized as any of the above, or may be categorized as some other level.

As is further illustrated, if an alert needs to be sent, monitoring service system 100 sends the alert or causes the alert to be sent, block 210. In some embodiments, monitoring service system 100 sends the alert to the one or more computer systems of the one or more subscriber enterprises 112 which had sent the received data, and optionally, other similarly situated subscriber enterprises.

In some embodiments, concurrently with contextually analyzing the received data, block 206, monitoring service system 100 also generates and applies data retention standards to database 106, block 212. However, in various embodiments, the rules processing engine 108 of monitoring service system 100 may apply the standards to database 106 at predetermined times rather than in real time, concurrently with contextually analyzing the received data, block 206. The standards may determine different types of treatment for different types of data. For example, raw processor data may be kept for a month, while process/service data may be kept only for a day. The data retention standards may also determine what monitoring service system 100 will do with the data pruned by rules processing engine 108. In some embodiments, the pruned data may be archived.

Also, as illustrated, monitoring service system 100 also generates and maintains summarization data values in database 106, block 214, in some embodiments concurrently with contextually analyzing the received data, block 206, and/or applying the data retention standards, block 212. However, in various embodiments, rules processing engine 108 of monitoring service system 100 may generate the summarization data values at predetermined times rather than in real time, concurrently with contextually analyzing the received data, block 206 and/or applying the data retention standards, block 212. Data values may include such metrics as standard deviation, mean, and median values for a specific set of data (e.g., for a specific subscriber enterprise 112 or for a specific industry group) over a period of time such as hourly, daily, weekly, or monthly. These metric types and time periods are by no means exhaustive, however. Additionally, maintained data values may be used to facilitate generation of the baseline metric used in the above described contextual analysis or may serve as the baseline metric. Further, the summarization data values generated and maintained by rules processing engine 108 may be used for historical trend analysis and in the maintaining of a summary of system metrics. This summary is, in some embodiments, referred to as a "scoreboard."

As is further illustrated, monitoring service system 100 also updates a system metric summary ("scoreboard") of all or each of a number of subsets of subscriber enterprises, block 216, in some embodiments concurrently with contextually analyzing the received data, block 206, and/or applying the data retention standards, block 212, and/or generating and maintaining summarization data values, block 214. However, in various embodiments, rules processing engine 108 of monitoring service system 100 may update the system metric summary at pre-determined times rather than in real time, concurrently with contextually analyzing the received data, block 206, and/or applying the data retention standards, block 212, and/or generating and maintaining summarization data values, block 214. The system metric summary may summarize the "health" of one or more subscriber enterprises 112 in a single place, in some embodiments viewable as a graphic user interface. "Health" is contextually defined as a result of the above described analysis and may be classified as any one of a number of levels, including "healthy," "at risk," and "intervention required/critical." In some embodiments, these levels may correspond to the above described alert levels, with a "critical" alert corresponding to an "intervention required/critical" health status and with a "warning" alert level corresponding to an "at risk" health status. The graphical aspect of this system metric summary of monitoring service system 100 is illustrated in FIG. 3 and described in greater detail below.

Following the operations of contextually analyzing the received data, block 206, applying the data retention standards, block 212, generating the summarization data values, block 214, and/or updating the system metric summary, block 216, monitoring service system 100 may, in some embodiments, store the results of the above operations in database 106, block 218. By storing the results, future recalculating and generating can be accomplished much more quickly.

Finally, monitoring service system 100 may, as illustrated, provision a monitoring service system interface 110, block 220. Monitoring service system interface 110 may facilitate a user of monitoring service system 100 in monitoring the one or more computer systems of one or more subscriber enterprises 112. In various embodiments, monitoring service system interface 110 may facilitate monitoring service system 100 users in viewing the system metric summary, discussed above and below and depicted in FIG. 3. Monitoring service system interface 110 may also provide a view into database 106, allowing users to review summarization data values, baseline metrics, and raw received data. Additionally, monitoring service system interface 110 may, in some embodiments, be implemented as a graphical user interface, although it need not be.

FIG. 3 illustrates an exemplary system metric summary view, capable of display in the monitoring service system interface 110 aspect of the present invention, in accordance with various embodiments of the invention. As described above, system metric summary 300 is in some embodiments referred to as a "scoreboard." In the series of embodiments depicted here, the system metric summary 300 is a graphical user interface displayable in monitoring service system interface 110 of monitoring service system 100. The system metric summary 300 is shown as a table with two columns and a plurality of rows. For example, column one might be entitled "Enterprise" and might list in the rows beneath the column summaries of system metrics for the one or more subscriber enterprises 112. Here, three subscriber enterprises are depicted: Enterprise A 302, Enterprise B 310, and Enterprise C 318. Each row entry in the "Enterprise" column has a face, either smiling, neutral, or frowning, graphically depicting the health condition of the subscriber enterprise 112. In some embodiments, a smile may correspond to healthy, a neutral face may correspond to a health classification of "at risk," and a frown may correspond to a health condition of "critical." To be classified as healthy, a subscriber enterprise 112 must have all its processes and computer systems also classified as healthy. If one or more computer systems or processes of a subscriber enterprise 112 is classified as "critical" or "at risk," the subscriber enterprise 112 will also be so classified, in various embodiments corresponding with the worst classification received. For example, if a subscriber enterprise 112 has two computer systems, one classified "at risk," the other classified "critical," subscriber enterprise 112 would be classified as "critical." In addition to graphically conveying the health by a face, Enterprises A, B, and C 302/310/318 may also convey their health textually. As shown, Enterprise A 302 conveys that it is "<at risk>," Enterprise B 310 conveys that it is "<critical>," and Enterprise C 318 conveys that it is "<healthy>."

As illustrated, column two of the system metric summary 300 may be entitled "Computer System" and may display in the plurality of rows under its heading the computer systems corresponding to each subscriber enterprise 112. Each row under column two may be divided in multiple sub-columns, each intersection of a row and sub-column displaying one computer system. As shown, column two has three rows for the computer systems of Enterprises A, B, and C 302/310/318. Each row/enterprise in turn has three sub-columns/computer systems. Thus, Enterprise A 302 has three computer systems Computer System 1 304, Computer System 2 306, and Computer System 3 308. Enterprise B 310 has three computer systems Computer System 1 312, Computer System 2 314, and Computer System 3 316. Enterprise C 318 has three computer systems Computer System 1 320, Computer System 2 322, and Computer System 3 324. Each computer system displays the health of itself and its processes both graphically through faces, and textually, as discussed above.

FIG. 4 illustrates an overview of the subscriber enterprise aspect of the present invention, in accordance with various embodiments of the invention. As shown, subscriber enterprise 400 has three computer systems: first computer system 402, second computer system 404, and third computer system 406. Subscriber enterprise 400 need not, however, have the number of computer systems shown. Subscriber enterprise 400 may include one, two, or any plurality of computer systems. In various embodiments, subscriber enterprise 400 may have a database 408, which may be located on any one of the computer systems shown or on a computer system that is not shown. On one or more of the computer systems, subscriber enterprise 400 will have a monitoring process which will gather data associated with one or more system metrics of a computing system. The process will gather data from the system or systems on which it executes, as well as from other computer systems of subscriber enterprise 400 on which the process is not executing. On some pre-determined time basis, the process will gather the data associated with one or more system metrics of the one or more computer systems of the subscriber enterprise 400 and will store that data in database 408. Also, in a series of embodiments, the monitoring process will send the data associated with the one or more system metrics that are stored in the database 408 to a monitoring service system 412 that is external to the subscriber enterprise 400. Such sending may occur at pre-determined time intervals or may occur in real time as data is gathered and stored in database 408.

As illustrated, in some embodiments, data associated with one or more system metrics may be sent to monitoring service system 412 via a networking fabric 410. Networking fabric 410 may be a LAN, a WAN, the Internet, or any other networking fabric known in the art. Upon receipt of the data, monitoring service system 412 may contextually analyze the data and determine, based upon the results of the contextual analysis, if an alert is needed, as is described above and depicted in FIGS. 1 and 2. If an alert is needed, monitoring service system 412 may send the alert to subscriber enterprise 400, in some embodiments via a networking fabric, which may or may not be the same as networking fabric 410. The alert may be received by any one or more of the computer systems of subscriber enterprise 400. Upon receipt, the subscriber enterprise may notify a user of the alert, facilitating the user in handling the alert appropriately.

Also, not illustrated, subscriber enterprise 400 may have its computer systems 402, 404, and 406 maintained through image-based maintenance, which is the subject of co-pending patent application Ser. No. 11/282,169, entitled "IMAGE-BASED SYSTEM MAINTENANCE."

FIG. 5 illustrates a flow chart view of selected operations of the methods of the subscriber enterprise aspect of the present invention, in accordance with various embodiments of the invention. As illustrated, subscriber enterprise 400 initiates the above described monitoring process by gathering data associated with one or more system metrics from computer systems 402, 404, and 406 of subscriber enterprise 400, block 500. The data may, in some embodiments, be gathered at predetermined time intervals.

Upon gathering the data, the monitoring process of subscriber enterprise 400 stores the data in a database 408 of the subscriber enterprise 400, block 502. The database may be located on any computer system of subscriber enterprise 400 and, in various embodiments, may even be located on a computer system external to subscriber enterprise 400.

As illustrated, the monitoring process then waits and checks if a predetermined time interval has occurred before sending the stored data associated with the one or more system metrics, block 504. If the time interval has not occurred, the monitoring process waits for some other predetermined period of time and checks again, block 506. In various embodiments, however, the monitoring process does not wait for a predetermined time interval before sending the data, as depicted in blocks 504 and 506. Rather, in such a series of embodiments, the monitoring process proceeds straight from block 502 to block 508 and sends the stored data to the external monitoring service system 412 in real time as the data is stored, block 502.

In some embodiments, though, after the predetermined time interval has occurred, block 504, the monitoring process of subscriber enterprise 400 sends the stored data associated with one or more system metrics to the external monitoring service system 412, block 508, that monitoring service system 412 described in greater detail above and depicted in FIGS. 1, and 2. As illustrated in FIGS. 1 and 4, the stored data may be sent to the monitoring service system 412 from the subscriber enterprise 400 via a networking fabric 410. Such a networking fabric may be a LAN, a WAN, the Internet, or any other sort of networking fabric known in the art.

Upon receipt of the data, the monitoring service system 412 proceeds through a series of operations depicted in FIG. 2 and described in greater detail above. Among those operations, the monitoring service system 412 determines if an alert is needed, block 510. The monitoring service system makes its determination based at least in part on the results of a contextual analysis of the data received from subscriber enterprise 400. This contextual analysis is also depicted and described in greater detail above. If the monitoring service system 412 determines that an alert needs to be sent, the monitoring service system 412, in various embodiments, sends the alert or causes the alert to be sent. The alert may be directed toward the subscriber enterprise 400 which sent the data, and may be sent via the same networking fabric 410 over which the data was sent, or may be sent via a different networking fabric.

As illustrated, subscriber enterprise 400 may then receive the alert from the monitoring service system, block 512. In some embodiments, the alert may be received by the monitoring process of subscriber enterprise 400, which may listen for the alert.

If the monitoring process receives an alert, block 512, the monitoring process may then, in some embodiments, notify one or more users of the subscriber enterprise 400 of the alert and its contents, block 514. The monitoring process may then facilitate the user or users in handling the alert, in various embodiments.

Also, as illustrated, after sending the stored data to the monitoring service system 412, the monitoring process waits a predetermined time interval, block 516, before returning to the first operation of gathering data from computer systems, block 500. In other embodiments not illustrated here, however, the monitoring process may loop back and gather data, block 500 immediately after sending the data to the monitoring service system 412, concurrently with sending the data, or even before sending the data.

Figure 6:
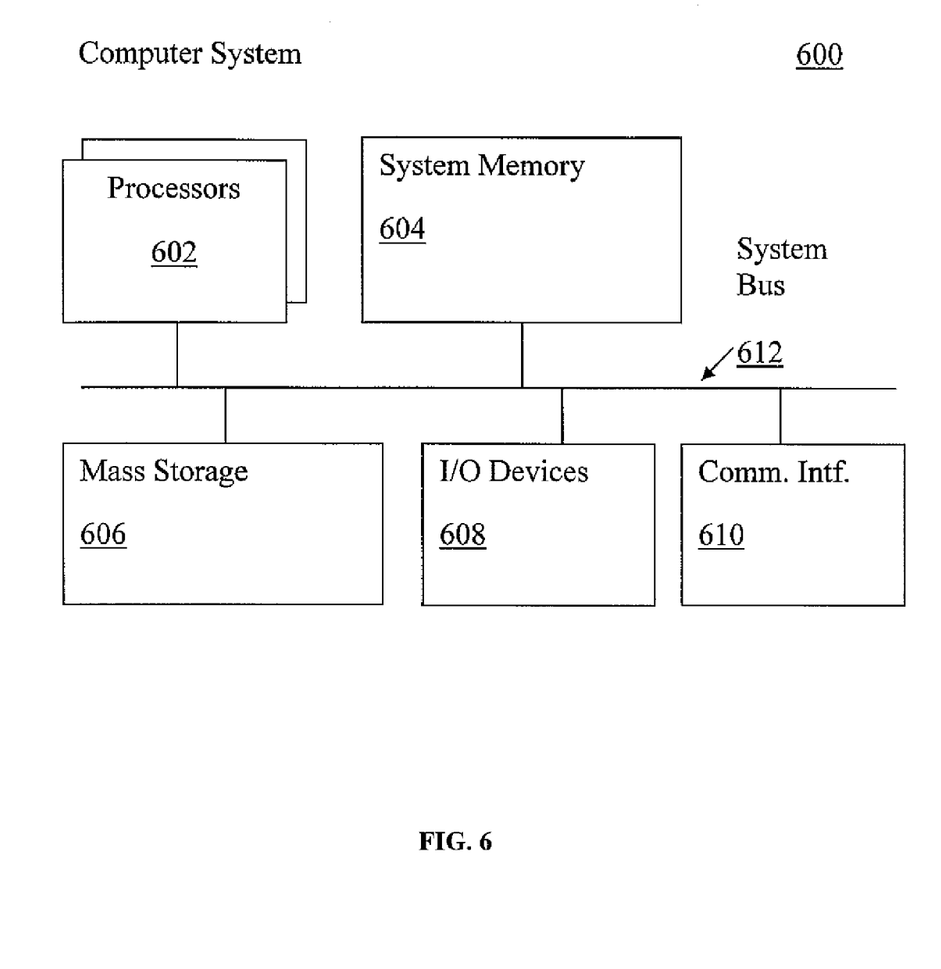
FIG. 6 illustrates an example computer system suitable for use to practice the client and/or server aspect of the present invention, in accordance with various embodiments.

FIG. 6 illustrates an example computer system suitable for use to practice the client and/or server aspect of the present invention, in accordance with various embodiments. As shown, computer system 600 includes one or more processors 602 and system memory 604. Additionally, computer system 600 includes input/output devices 608 (such as keyboard, cursor control, and so forth). The elements are coupled to each other via system bus 612, which represents one or more buses. In the case of multiple buses, they are bridged by one or more bus bridges (not shown). Each of these elements performs its conventional functions known in the art. In particular, system memory 604 and mass storage 606 are employed to store a working copy of the monitoring service system processes and/or the monitoring processes of the subscriber enterprise, and a permanent copy of the programming instructions implementing the monitoring service system processes and/or the monitoring processes of the subscriber enterprise, respectively. The permanent copy of the instructions implementing the monitoring service system processes and/or the monitoring processes of the subscriber enterprise may be loaded into mass storage 606 in the factory, or in the field, through a distribution medium (not shown) or through communication interface 610. The constitution of these elements 602-612 is known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the present invention. This application is intended to cover any adaptations or variations of the embodiments discussed herein. Therefore, it is manifestly intended that this invention be limited only by the claims and the equivalents thereof.

What is claimed is:

1. A method comprising:
    managing, by a monitoring service system of a monitoring service provider, via a network, a plurality of computer systems of one of a plurality of subscriber enterprises subscribing for monitoring service provided by the monitoring service provider, the monitoring service provider and the one of the subscriber enterprises being different enterprise entities, each of the computer systems having a current operating image and being capable of receiving a replacement operating image while operating with the current operating image, and the managing including periodically transmitting the replacement operating image through the network to each of the computer systems while each of the computer systems is operating with the current operating image, and causing the computer systems to switch to operate with the replacement operating image as the current operating image;
    receiving, by the monitoring service system, through the network, data associated with one or more system metrics from the plurality of computer systems;
    contextually analyzing, by the monitoring service system, the received data in view of prior received data of the one or more system metrics of (A) said computer systems and (B) one or more other computer systems of one or more other subscriber enterprises; and
    determining, by the monitoring service system of the monitoring service provider, based at least in part on the results of the contextual analysis, whether an alert related to at least a one of the one or more system metrics should be sent; and sending the alert or causing the alert to be sent, by the monitoring service system, if it is determined that the alert should be sent;
    wherein the managing further comprises transmitting a replacement operating image to one or more computer systems based on contextual analysis of data received from one or more other computer systems.

2. The method of claim 1, wherein the contextual analyzing further comprises generating one or more baseline metrics from the prior received data and comparing the received data associated with the one or more system metrics with the one or more baseline metrics.

3. The method of claim 1, further comprising maintaining, by the monitoring service system, a set of data retention standards for data stored on the monitoring service system, said data comprising at least said prior received data of the one or more system metrics, and applying said data retention standards to data stored on the monitoring service system, the data retention standards including multiple levels for multiple types of system metrics.

4. The method of claim 1, further comprising generating, by the monitoring service system, from the received data associated with the one or more system metrics and from the prior received data of the one or more system metrics, one or more summarization data values.

5. The method of claim 1, further comprising maintaining, by the monitoring service system, a single summary of system metrics, the single summary characterizing the system metrics by the results of the contextual analysis of the system metrics.

6. The method of claim 1, wherein the sending further comprises sending the alert to all or selected ones of the computer systems of the subscriber enterprises.

7. The method of claim 1, further comprising provisioning, by the monitoring service system, a monitoring service system interface to facilitate a user of the monitoring service system in monitoring the computer systems of the subscriber enterprises.

8. The method of claim 1, wherein said transmitting comprises transmitting to a stand-by partition or virtual machine of a first of the one or more computer systems, the first computer system having a plurality of partitions or virtual machines.

9. A method comprising:
    maintaining, by at least one of a plurality of computer systems of a subscriber enterprise, data associated with one or more system metrics of one or more of the plurality of computer systems, each of the computer systems having a current operating image and being capable of receiving a replacement operating image while operating with the current operating image;
    sending, by the at least one of a plurality of computer systems, to a monitoring service system of a monitoring service provider from whom the subscriber enterprise subscribes for monitoring service, the monitoring service provider and subscriber enterprises being different enterprise entities, and the monitoring service system being external to the plurality of computer systems, the data associated with the one or more system metrics to facilitate the monitoring service system in contextually analyzing the data associated with the one or more system metrics, the contextual analysis including comparing the data sent to previously sent data of the one or more system metrics of (A) the plurality of computer systems and (B) one or more other computer systems of one or more other subscriber enterprises; and receiving, by the at least one of a plurality of computer systems, a replacement operating image for the computer systems and an instruction to switch the computer systems to operate with the replacement operating image as the current operating image, the receiving being as a result of the contextual analysis.

10. The method of claim 9, wherein the sending of data associated with the one or more system metrics is performed at predetermined time intervals or in real time.

11. The method of claim 9, wherein said receiving comprises receiving the replacement operating image into a stand-by partition or virtual machine of a first of the computer systems, the first computer system having a plurality of partitions or virtual machines.

12. The method of claim 9, further comprising localizing by the at least one of a plurality of computer systems the received replacement operating image for the computer systems of the subscriber enterprise.

13. A monitoring service system of a monitoring service provider comprising:

a processor; and logic operated by the processor and adapted to:

manage via a network, a plurality of computer systems of one of a plurality of subscriber enterprises subscribing for monitoring service provided by monitoring service provider, the monitoring service provider and the one of the subscriber enterprises being different enterprise entities; and the managing including periodically transmitting a replacement operating image through the network to each of the computer systems while each of the computer systems is operating with a current operating image, and causing the computer systems to switch to operate with the replacement operating image as the current operating image;

receive data associated with one or more system metrics from the plurality of computer systems;

contextually analyze the received data in view of prior received data of the one or more system metrics of (A) said computer systems and (B) one or more other computer systems of one or more other subscriber enterprises;

determine, based at least in part on the results of the contextual analysis, whether an alert related to at least a one of the one or more system metrics should be sent; and send the alert or causing the alert to be sent, if it is determined that the alert should be sent;

wherein the logic is further configured to transmit a replacement operating image to the computer systems based on contextual analysis of data received from the other computer systems.

14. The monitoring service system of claim 13, wherein the logic adapted to said contextually analyze the received data further includes logic adapted to generate one or more baseline metrics from the prior received data and compare the received data associated with the one or more system metrics with the one or more baseline metrics.

15. The monitoring service system of claim 13, wherein the logic is further adapted to maintain a single summary of system metrics, the single summary characterizing the system metrics by the results of the contextual analysis of the system metrics.

16. The monitoring service system of claim 13, wherein the logic is configured to transmit the replacement operating image to a stand-by partition or virtual machine of a first of the one or more computer systems, the first computer system having a plurality of partitions or virtual machines.

* * * * *